US012118059B2

(12) United States Patent
Kalantzis et al.

(10) Patent No.: US 12,118,059 B2
(45) Date of Patent: Oct. 15, 2024

(54) PROJECTION-BASED TECHNIQUES FOR UPDATING SINGULAR VALUE DECOMPOSITION IN EVOLVING DATA SETS

(71) Applicant: International Business Machines Corporation, Armonk, NY (US)

(72) Inventors: Vasileios Kalantzis, White Plains, NY (US); Georgios Kollias, White Plains, NY (US); Shashanka Ubaru, Ossining, NY (US); Lior Horesh, North Salem, NY (US); Kenneth Lee Clarkson, Madison, NJ (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 17/335,928

(22) Filed: Jun. 1, 2021

(65) Prior Publication Data

US 2022/0382831 A1    Dec. 1, 2022

(51) Int. Cl.
*G06F 17/16* (2006.01)
*G06F 16/22* (2019.01)
*G06F 17/11* (2006.01)

(52) U.S. Cl.
CPC .......... *G06F 17/16* (2013.01); *G06F 16/2237* (2019.01); *G06F 17/11* (2013.01)

(58) Field of Classification Search
CPC ....... G06F 17/11; G06F 16/2237; G06F 17/16
See application file for complete search history.

(56) References Cited

U.S. PATENT DOCUMENTS

| | | | |
|---|---|---|---|
| 7,359,550 B2 | 4/2008 | Brand | |
| 7,475,027 B2 | 1/2009 | Brand | |
| 8,903,756 B2 | 12/2014 | Zhao et al. | |
| 9,436,760 B1 | 9/2016 | Tacchi et al. | |
| 10,824,813 B2 | 11/2020 | Smith et al. | |
| 2003/0225749 A1* | 12/2003 | Cox | G06F 16/35 |
| 2006/0047441 A1* | 3/2006 | Homayouni | G16B 50/00 702/19 |

(Continued)

OTHER PUBLICATIONS

Hernandez, Roman, and Tomas, A Robust and Efficient Parallel SVD Solver Based on Restarted Lanczos Bidiagonalization, Electronic Transactions on Numerical Analysis. vol. 31, pp. 68-85 (Year: 2008).*

(Continued)

*Primary Examiner* — Matthew D Sandifer
(74) *Attorney, Agent, or Firm* — Kelsey M. Skodje (57) ABSTRACT

A system, method, and computer program product are disclosed. The method includes loading a first set of data as an initial matrix and determining a truncated singular value decomposition (SVD) of the initial matrix. The method also includes loading a second set of data as a new matrix, generating a first projection matrix, which approximates k leading left singular vectors of the updated matrix, and generating a second projection matrix, which approximates k leading right singular vectors of the updated matrix. Further, the method includes determining based on the initial matrix, the new matrix, the SVD of the existing matrix, and the first or second projection matrix, an approximate truncated SVD of the updated matrix.

20 Claims, 5 Drawing Sheets

(56) References Cited

U.S. PATENT DOCUMENTS

2021/0349921 A1* 11/2021 Brown ................ G06F 16/93

OTHER PUBLICATIONS

Yanai, Takeuchi, and Takane, Projection Matrices, Generalized Inverse Matrices, and Singular Value Decomposition, pp. 25 (Year: 2011).*

What is Data Batch Processing, Tracers (Year: 2020).*

Anonymous, "Context-Based Concept Resolution with Structured and Unstructured Sources," an IP.com Prior Art Database Technical Disclosure, IP.com No. IPCOM000246223D, May 17, 2016, 7 pgs.

Anonymous, "Method for Discovering a Similar Past Project or Work Item by Analysing Unstructured Data," an IP.com Prior Art Database Technical Disclosure, IP.com No. IPCOM000245701D, Mar. 31, 2016, 3 pgs.

Anonymous, "Technique for Classifying Text Emails Using a Layout Semantic Similarity Metric," an IP.com Prior Art Database Technical Disclosure, IP.com No. IPCOM000182486D, May 1, 2009, 4 pgs.

Berry, M. "Large-scale sparse singular value computations," The International Journal of Supercomputing Applications 6.1 (1992): 13-49, DOI 10.1.1.37.8591.pdf.

Bradford, R. B., "Relationship Discovery in Large Text Collections Using Latent Semantic Indexing," SAIC, Reston, Virginia, accessed Jan. 10, 2021, 10 pgs.

Brand, M. "Fast Low-Rank Modifications of the Think Singular Value Decomposition," Linear Algebra and its Applications 415 (2006) 20-30.

Clarkson et al., "Order Embeddings from Merged Ontologies using Sketching," https://arxiv.org/abs/2101.02158, arXiv:2101.02158v1 [cs.CL] Jan. 6, 2021, 11 pgs.

Deerwester et al., "Indexing by Latent Semantic Analysis," accessed Jan. 10, 2021, 34 pgs.

Kalantzis et al., "Projection techniques to update the truncated SVD of evolving matrices," arXiv:2010.06392v1 [math.NA] Oct. 13, 2020, 13 pgs.

Mell et al., "The NIST Definition of Cloud Computing," Recommendations of the National Institute of Standards and Technology, U.S. Department of Commerce, Special Publication 800-145, Sep. 2011, 7 pgs.

Rozeva et al., "Assessing semantic similarity of texts—Methods and algorithms," Conference Paper in AIP Conference Proceedings, Dec. 2017, DOI 10.1063/1.5014006, 10 pgs.

Simon et al., "On Updating Problems in Latent Semantic Indexing," Ernest Orlando Lawrence , Berkeley National Laboratory, LBNL-41101, UC-405, Nov. 1997, 12 pgs.

Subalaitha et al., "Semantic Search Using Latent Semantic Indexing and WordNet," ARPN Journal of Engineering and Applied Sciences, vol. 12, No. 2, Jan. 2017, 5 pgs.

Tougas et al., "Two uses for updating the partial singular value decomposition in latent semantic indexing." Applied Numerical Mathematics 58 (2008): 499-510.

Tougas et al., "Updating the Partial Singular Value Decomposition in Latent Semantic Indexing," Computational Statistics and Data Analysis 52.1 (2007): 174-183.

Vecharynski et al., "Fast Updating Algorithms for Latent Semantic Indexing," arXiv:1310.2008v2 [math.NA] May 13, 2014, 28 pgs.

Yamazaki et al. "Sampling Algorithms to Update Truncated SVD," 2017 IEEE International Conference on Big Data (BigData), IEEE, 2017, pp. 817-826.

Yamazaki et al., "Randomized algorithms to update partial singular value decomposition on a hybrid CPU/GPU cluster." SC'15: Proceedings of the International Conference for High Performance Computing, Networking, Storage and Analysis. IEEE, 2015, 12 pgs.

* cited by examiner

PROJECTION-BASED TECHNIQUES FOR UPDATING SINGULAR VALUE DECOMPOSITION IN EVOLVING DATA SETS

BACKGROUND

The present disclosure relates to data storage and analysis and, more specifically, determining an approximate rank-k truncated singular value decomposition of a matrix that is updated over time.

Datasets can be organized into matrices. New data can be added to an existing matrix as additional rows and/or columns. Relationships between entities (e.g., terms and documents) in a matrix can be represented as linearly independent factors in a reduced-dimensional space by finding a singular value decomposition (SVD) of the matrix. In order to remove less important features, such as those related to noise, from the SVD, a rank-k truncated SVD can be generated. The rank-k truncated SVD approximates the original relationships as factor values in k-dimensional space. These representations of extracted features can be used for a variety of applications, such as latent semantic analysis (LSA) and recommender systems.

SUMMARY

Various embodiments are directed to a system that includes at least one processing component, at least one memory component, an indexing module, and an update module. The indexing module is configured to load a first set of data as an initial matrix and determine a truncated singular value decomposition (SVD) of the initial matrix. The indexing module is also configured to load a second set of data as a new matrix and combine the initial matrix and the new matrix to form an updated matrix. The update module is configured to generate a first projection matrix, which approximates k leading left singular vectors of the updated matrix, and a second projection matrix, which approximates k leading right singular vectors of the updated matrix. The update module is also configured to determine, based on the initial matrix, the new matrix, the SVD of the existing matrix, and the first or second projection matrix, an approximate truncated SVD of the updated matrix. The determining the approximate truncated SVD of the updated matrix can include carrying out 2k steps of a Lanczos algorithm, or applying another eigensolver algorithm, on a matrix built from the initial matrix, the new matrix, and the SVD of the existing matrix. In response to determining the approximate truncated SVD, the indexing module can load the updated matrix as a next initial matrix and a next set of data as a new matrix. The update module can be configured to combine the next initial matrix and the next new matrix to form a next updated matrix. A next projection matrix, which approximates k leading left singular vectors of the updated matrix, can be generated. The update module can also be configured to determine, based on the next initial matrix, the next new matrix, the approximate truncated SVD of the updated matrix, and the next projection matrix, an approximate truncated SVD of the next updated matrix. The determining the approximate truncated SVD of the next updated matrix can include carrying out 2k steps of a Lanczos algorithm, or applying another eigensolver algorithm, on a matrix built from the next initial matrix, the next new matrix, and the SVD of the updated matrix. In some embodiments, the initial matrix is a term-document matrix.

Further embodiments are directed to a method, which includes loading a first set of data as an initial matrix and determining a truncated singular value decomposition (SVD) of the initial matrix. The method also includes loading a second set of data as a new matrix, combining the initial matrix and the new matrix to form an updated matrix, generating a first projection matrix, which approximates k leading left singular vectors of the updated matrix, and generating a second projection matrix, which approximates k leading right singular vectors of the updated matrix. Further, the method includes determining based on the initial matrix, the new matrix, the SVD of the existing matrix, and the first or second projection matrix, an approximate truncated SVD of the updated matrix. The determining the approximate truncated SVD of the updated matrix can include carrying out 2k steps of a Lanczos algorithm, or applying another eigensolver algorithm, on a matrix built from the initial matrix, the new matrix, and the SVD of the existing matrix. The method can also include, in response to determining the approximate truncated SVD, loading the updated matrix as a next initial matrix and loading a next set of data as a new matrix. The next initial matrix and the next new matrix can be combined to form a next updated matrix, and a next projection matrix, which approximates k leading left singular vectors of the updated matrix, can be generated. The method can then include determining, based on the next initial matrix, the next new matrix, the approximate truncated SVD of the updated matrix, and the next projection matrix, an approximate truncated SVD of the next updated matrix. The determining the approximate truncated SVD of the next updated matrix can include carrying out 2k steps of a Lanczos algorithm, or applying another eigensolver algorithm, on a matrix built from the next initial matrix, the next new matrix, and the SVD of the updated matrix. In some embodiments, the initial matrix is a term-document matrix.

Additional embodiments are directed to a computer program product, which includes a computer readable storage medium having program instructions embodied therewith, the program instructions executable by a processor to cause a device to perform a method. The method includes includes loading a first set of data as an initial matrix and determining a truncated singular value decomposition (SVD) of the initial matrix. The method also includes loading a second set of data as a new matrix, combining the initial matrix and the new matrix to form an updated matrix, generating a first projection matrix, which approximates k leading left singular vectors of the updated matrix, and generating a second projection matrix, which approximates k leading right singular vectors of the updated matrix. Further, the method includes determining based on the initial matrix, the new matrix, the SVD of the existing matrix, and the first or second projection matrix, an approximate truncated SVD of the updated matrix. The determining the approximate truncated SVD of the updated matrix can include carrying out 2k steps of a Lanczos algorithm, or applying another eigensolver algorithm, on a matrix built from the initial matrix, the new matrix, and the SVD of the existing matrix. The method can also include, in response to determining the approximate truncated SVD, loading the updated matrix as a next initial matrix and loading a next set of data as a new matrix. The next initial matrix and the next new matrix can be combined to form a next updated matrix, and a next projection matrix, which approximates k leading left singular vectors of the updated matrix, can be generated. The method can then include determining, based on the next initial matrix, the next new matrix, the approximate truncated SVD of the updated matrix, and the next projection matrix, an approximate truncated SVD of the next updated matrix. The determining the approximate truncated SVD of the next updated matrix can include carrying out 2k steps of a Lanczos algorithm, or applying another eigensolver algorithm, on a matrix built from the next initial matrix, the next new matrix, and the SVD of the updated matrix.

DETAILED DESCRIPTION

Large datasets (e.g., terms and documents from text corpora, user reviews of products, spatiotemporal datasets, etc.) can be organized into matrices. For example, a collection of 'm' terms and 'n' documents can be arranged in an m×n term-document matrix in applications such as latent semantic analysis (LSA), e.g., latent semantic indexing (LSI). In response to a query, relevant documents can then be found by determining the similarity between the query and terms in the matrix. LSA can also be used to find similarities between documents, such as in document categorization applications. However, relying on literal similarity between terms can result in numerous errors. For example, different terms can share the same meaning (synonymy), and single terms can have multiple meanings (polysemy) depending upon context. Additionally, it is difficult to find language-independent similarities or similarities between documents/queries across different languages using literal similarities. Therefore, it can be useful to extract features representing latent semantic associations between terms. There are a variety of additional applications that use latent factor associations found in large datasets, such as spatiotemporal datasets (e.g., for disease outbreak detection and agricultural planning) and user-product review datasets (e.g., for recommender systems).

In order to find latent factor associations in a large dataset, singular value decomposition (SVD) can be applied to a matrix containing the dataset. The SVD represents the matrix's entity relationships as linearly independent factors in a reduced-dimensional space. Relationships between entities (e.g., documents, terms, queries, etc.) can be found based on their projections in the latent semantic dimension. However, the full SVD of a matrix can be noisy due to unimportant information, polysemy, synonymy, etc. Additionally, the size of a dataset is often large enough that using a full SVD is beyond a system's computational resources.

A truncated SVD can therefore be used to represent entity relationships with a lower-rank approximation. A rank-k truncated SVD approximates the original entity relationships as factor values in a k dimensional space. However, generating the truncated SVD for a dataset can use a majority of a system's computational resources. This is particularly a problem in evolving datasets because it is often beyond practical limitations of a system to generate a new truncated SVD each time new data is added to the original matrix. One technique that addresses this is computing a truncated SVD of only the new data, but this has significant disadvantages. For example, the new truncated SVD(s) will be less accurate without including the original data, and the original SVD will not be updated to improve its accuracy. Additionally, when new data is added in large quantities and/or at high frequencies (e.g., as with streaming video or audio data), the computing resources can still be overwhelmed by generating new truncated SVDs.

Disclosed herein are techniques for updating a truncated SVD of an evolving dataset based on both the existing and new data. The dataset can be a sparse matrix subject to additions of new rows and/or columns. A projection viewpoint is employed to generate an approximate truncated SVD of the updated matrix. A pair of projection subspaces approximating the linear spans of the k leading left and right singular vectors of the updated matrix can be built. The approximate rank-k truncated SVD of the updated matrix can be generated by finding the k leading left singular vectors and associated singular values. This can be carried out in a matrix-free fashion and does not require computation of the k leading right singular vectors.

Figure 1:
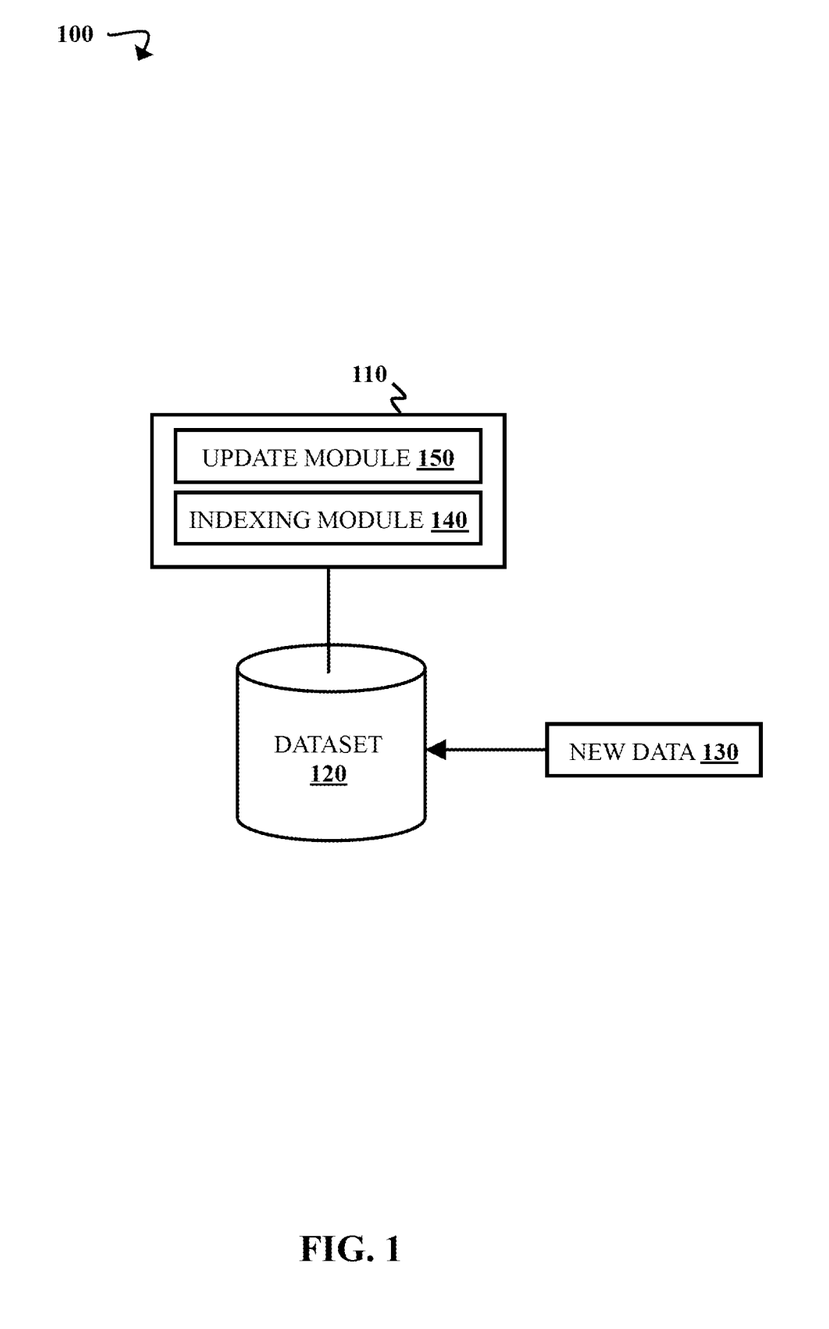
FIG. 1 is a block diagram illustrating a dataset update environment, according to some embodiments of the present disclosure.

FIG. 1 is a block diagram illustrating a dataset update environment 100, according to some embodiments of the present disclosure. The dataset updating environment 100 includes a data processing component 110, a dataset 120, and new data 130. The data processing component 110 includes an indexing module 140 and an update module 150.

The dataset 120 can be any type of data (e.g., documents having searchable features, customer scores, spatiotemporal data, etc.) and can be updated with new data 130 from at least one data source. The dataset 120 can be part of a recommender system. For example, the dataset 120 can include customer scores/ratings of films and television, music, books, merchandise, services, destinations, etc. In these instances, data sources can include ratings aggregators, review sites, streaming services, retailers, social media services, content delivery networks, etc. The dataset 120 can also be part of a latent semantic analysis (LSA) system, such as a latent semantic indexing (LSI) system, used in applications such as information retrieval, document categorization, machine learning, or other natural language processing applications. Data sources can include sets of terms and documents, such as text corpora.

The data processing component 110 carries out operations directed to vector space modeling of the dataset 120 as it evolves. That is, updates to the modeling can be carried out each time new data 130 is added to the dataset 120. The indexing module 140 loads the dataset 120 as a matrix. The matrix can be an arbitrary rectangular matrix having different entities in its rows and columns. For example, the indexing module 140 may load data as a term-document matrix in the context of LSI or a user-item ranking matrix in the context of a recommender system.

The indexing module 140 can find a singular value decomposition (SVD) of the initial matrix. The indexing module 140 determines a rank-k truncated SVD for the initial matrix in order to generate an approximate model of the original entity relationships. In the case of a term-document matrix, the rank-k truncated SVD can represent term-document, term-term, and document-document similarities as factor values in the k dimensional space. The value of k can be any appropriate number of dimensions (e.g., k=10, 50, 100, 200, 300, etc.) for a given application, chosen based on the desired accuracy, size of matrix, spectral gap, etc., as is understood by persons of ordinary skill.

New data 130 is added to the dataset 120 at least once. The new data 130 can come from at least one data source (e.g., ratings aggregators, review sites, streaming services, retailers, social media services, content delivery networks, text corpora, spatiotemporal data sources, etc.). The new data is added to the existing matrix by the indexing module 140. For example, an updated matrix A can be $$A = \begin{pmatrix} B \\ E \end{pmatrix}, \text{ or } A = (B\ E),$$

wherein B represents a matrix for which a rank-k truncated SVD ("truncated SVD") is known, and E represents newly added rows or columns (new data 130), respectively. After a first update, the known truncated SVD of B can be an approximate truncated SVD. This is discussed in greater detail below.

The update module 150 determines an approximate rank-k truncated SVD of the updated matrix. As new data 130 is added in subsequent updates, the process can be repeated. In these instances, matrix A becomes matrix B at the next level. In some embodiments, the initial matrix can be updated to modify at least one of its non-zero entries. This is not illustrated herein. The update module 150 can approximate the updated truncated SVD by building a pair of projection subspaces that approximate the linear span of the k leading singular vectors of the updated matrix A. Techniques for approximating the truncated SVD of the updated matrix are discussed in greater detail with respect to FIG. 2.

Figure 2:
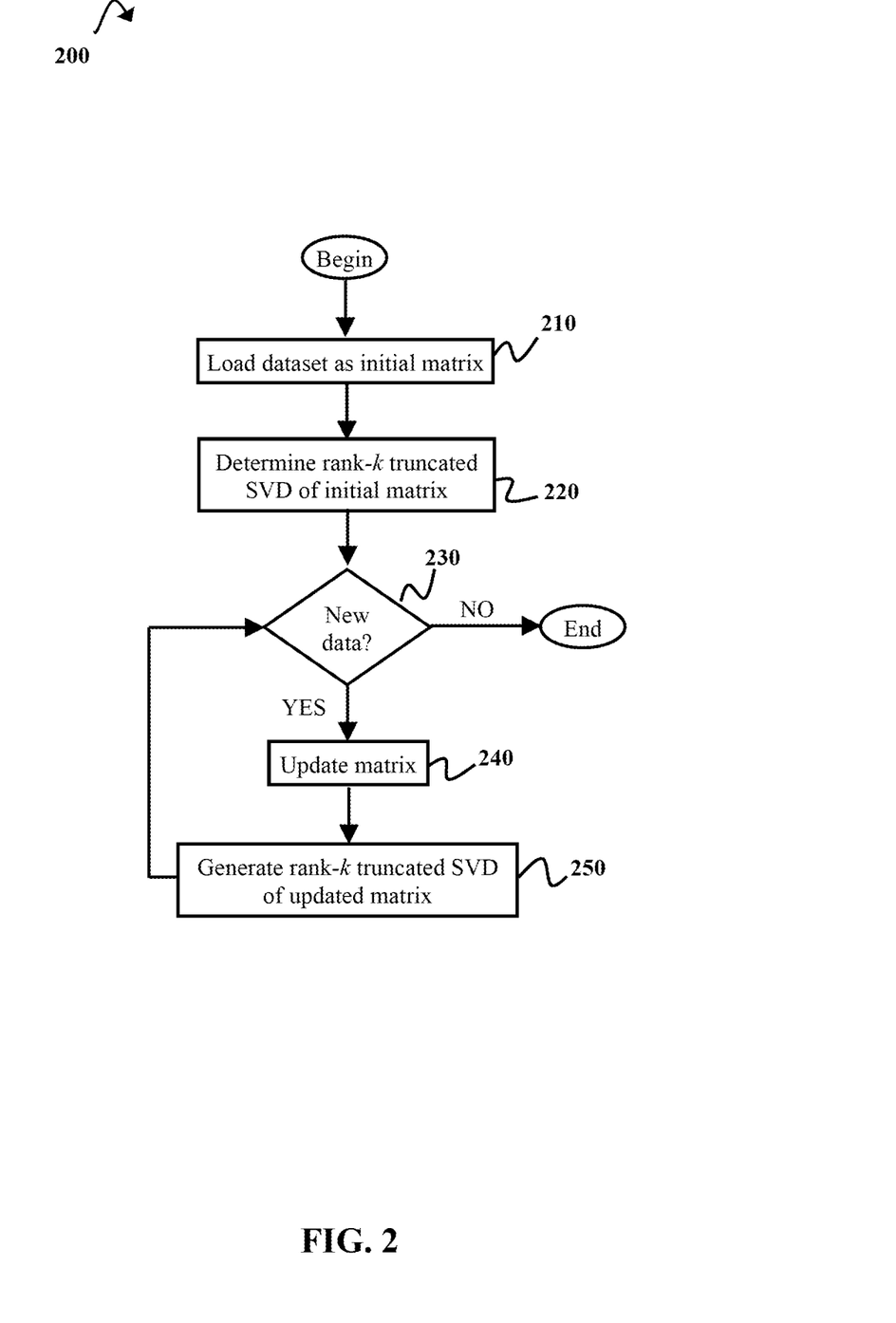
FIG. 2 is a flow diagram illustrating a process of determining an approximate rank-k truncated singular value decomposition for an evolving dataset, according to some embodiments of the present disclosure.

FIG. 2 is a flow diagram illustrating a process 200 of determining an approximate rank-k truncated SVD of an evolving matrix, according to some embodiments of the present disclosure. To illustrate process 200, but not to limit embodiments, FIG. 2 is described within the context of environment 100 of FIG. 1. Where elements referred to in FIG. 2 are identical to elements shown in FIG. 1, the same reference numbers are used in each figure.

The indexing module 140 loads an existing dataset 120 as an initial matrix. This is illustrated at operation 210. For example, the dataset 120 can be a collection of terms and documents in a term-document or document-term matrix. In other embodiments, the dataset 120 can include user ratings and products in a user rating-product matrix. Any appropriate dataset 120 can be used, depending upon the type of data and its application (e.g., recommender systems, LSA, LSI, geostatistical screening, etc.). Additional examples can include feature-term, term-term, and document-document matrices.

A rank-k truncated SVD of the initial matrix is determined. This is illustrated at operation 220. The truncated SVD of the initial matrix can be generated by the indexing module 140 after loading the data at operation 210. However, the truncated SVD of the initial matrix B can be generated any time prior to or at operation 220. Herein, "matrix B" represents a matrix with an available truncated SVD. The full SVD of the initial matrix B∈ $\mathbb{C}^{m \times n}$ can be written as:

$$B = U\Sigma V^H \qquad \text{Eq. 1}$$

where U is an m×m unitary matrix, Σ is an m×n diagonal matrix, and V is an n×n unitary matrix. The matrices from the full SVD of matrix B can be defined as $U_j=[u^{(1)}, \ldots, u^{(j)}]$, $\Sigma_j=\text{diag}[\sigma^{(1)}, \ldots, \sigma^{(j)}]$, and $V_j=[v^{(1)}, \ldots, v^{(j)}]$, where $u^{(j)}$ are left singular vectors, $v^{(j)}$ are right singular vectors, and $\sigma^{(j)}$ are singular values. The truncated SVD of the initial matrix B includes the k leading singular values and associated left and right singular vectors from the full SVD and can be written as:

$$B_k = U_k \Sigma_k V_k^H \qquad \text{Eq. 2}$$

It is then determined whether new data 130 has been received. This is illustrated at operation 230. If new data 130 has not been received, process 200 can end. However, if new data 130 is received, the existing matrix B is updated to include the new data. This is illustrated at operation 240. The indexing module 140 can load the new data 130 as matrix E. The indexing module 140 adds matrix E to the existing matrix B, forming an updated matrix A. For example, the updated matrix can be $$A = \begin{pmatrix} B \\ E \end{pmatrix}, \text{ or } A = (B\ E),$$

wherein E represents newly added rows or columns, respectively. In some embodiments, the indexing module 140 adds the entire set of new data 130 in the update as matrix E. In other embodiments, the new data 130 can be added in batches. For example, a dataset may be added to an existing matrix B in a series of updates so that a selected number of rows E (e.g., 1-10 rows) are added to matrix B at each update.

An approximate rank-k truncated SVD of the updated matrix A is generated. This is illustrated at operation 250. The determination of the approximate truncated SVD of matrix A is illustrated in the context of matrix $$A = \begin{pmatrix} B \\ E \end{pmatrix},$$

but substantially similar techniques can be used to determine a rank-k truncated SVD in embodiments where matrix A=(B E), as will be understood by those of ordinary skill in the art. Herein, the same notation is used for the existing matrix B and the updated matrix A, except that a circumflex is added to the top of each variable for matrix A. Thus, the rank-k truncated SVD of matrix A can be written as:

$$A_k = \hat{U}_k \hat{\Sigma}_k \hat{V}_k^H \qquad \text{Eq. 3}$$

The update module 150 can approximate the truncated SVD $A_k$ for matrix $$A = \begin{pmatrix} B \\ E \end{pmatrix},$$

where E is of size s×n, by generating projection matrices Z and W such that range(Z) approximates range($\hat{U}_k$), and range($W^H$) approximates range($\hat{V}_k^H$). The truncated SVD $A_k$ can then be approximated based on the k leading singular eigenvalues $\Theta_k$ and associated k leading left $F_k$ and right $G_k$ singular eigenvectors of matrix $Z^H A W$:

$$A_k \approx (ZF_k)\Theta_k(WG_k)^H \qquad \text{Eq. 4}$$

The update module 150 can set the left projection subspace Z equal to $$\begin{pmatrix} U_k & \\ & I_s \end{pmatrix},$$

where $I_s$ is an identity matrix of size s. The update module 150 can set the right projection subspace W equal to an identity matrix of size n ($I_n$) because the right singular vectors of matrix A can satisfy $\hat{v}^{(i)} \subseteq \text{range}(I_n)$, i=1, ..., n. The update module 150 can therefore skip the computation of the k leading right singular vectors $G_k$ because matrix $Z^H AW$ is equal to matrix $Z^H A$. The update module 150 can determine the k leading left singular vectors $F_k$ and associated singular values $\Theta_k$ of matrix $Z^H A$ by computing a partial eigen-decomposition of matrix $Z^H AA^H Z$. This can be accomplished by carrying out 2k steps of the Lanczos algorithm on $Z^H AA^H Z$. However, another eigensolver can be used in place of, or in addition to, the Lanczos algorithm in some embodiments, as will be understood by persons of ordinary skill in the art.

Given input B, $U_k$, $\Sigma_k$, $V_k$, E, and Z, the Lanczos algorithm outputs an approximate rank-k SVD $\overline{U}_k$, $\overline{\Sigma}_k$, and $\overline{V}_k$, where $\overline{U}_k \approx \hat{U}_k$, $\overline{\Sigma}_k \approx \hat{\Sigma}_k$, and $\overline{V}_k \approx \hat{V}_k$. The output matrix $\overline{U}_k$ can be set equal to the k leading columns of matrix $ZF_k$, where $F_k$ is the set of left singular vectors computed by the Lanczos algorithm. The diagonal entries of output matrix $\overline{\Sigma}_k$ can be set equal to the square roots of the k leading eigenvalues of matrix $F_k^H Z^H AA^H ZF_k$, which is a tridiagonal matrix of size 2k×2k. The update module 150 can then set $\overline{V}_k$ equal to $A^H \overline{U}_k \overline{\Sigma}_k^{-1}$. Therefore, the Lanczos algorithm output provides an approximate truncated SVD of matrix A.

Process 200 can then return to operation 230 in order to determine whether new data 130 has again been received. If new data (matrix E) has been added, process 200 returns to operation 240. The updated matrix whose approximate truncated SVD was determined at operation 250 (matrix A) becomes the existing matrix (matrix B) each time operation 240 is repeated. The addition of new data E results in a newly updated matrix A. The update module 150 then repeats operation 250 for the updated matrix A in order to determine an updated approximate rank-k truncated SVD ($A_k$) of the updated matrix A. Each time these operations are repeated, the most recently updated $A_k$ becomes $B_k$ at operation 250.

Operations 230-250 can be repeated until it is determined that there is no new data at operation 230. At the same time, the approximate truncated SVDs determined with each update can be used in any appropriate applications (e.g., LSA, document categorization, recommender systems, geostatistical screening, etc.). Examples of uses for truncated SVDs are discussed in greater detail above.

Figure 3:
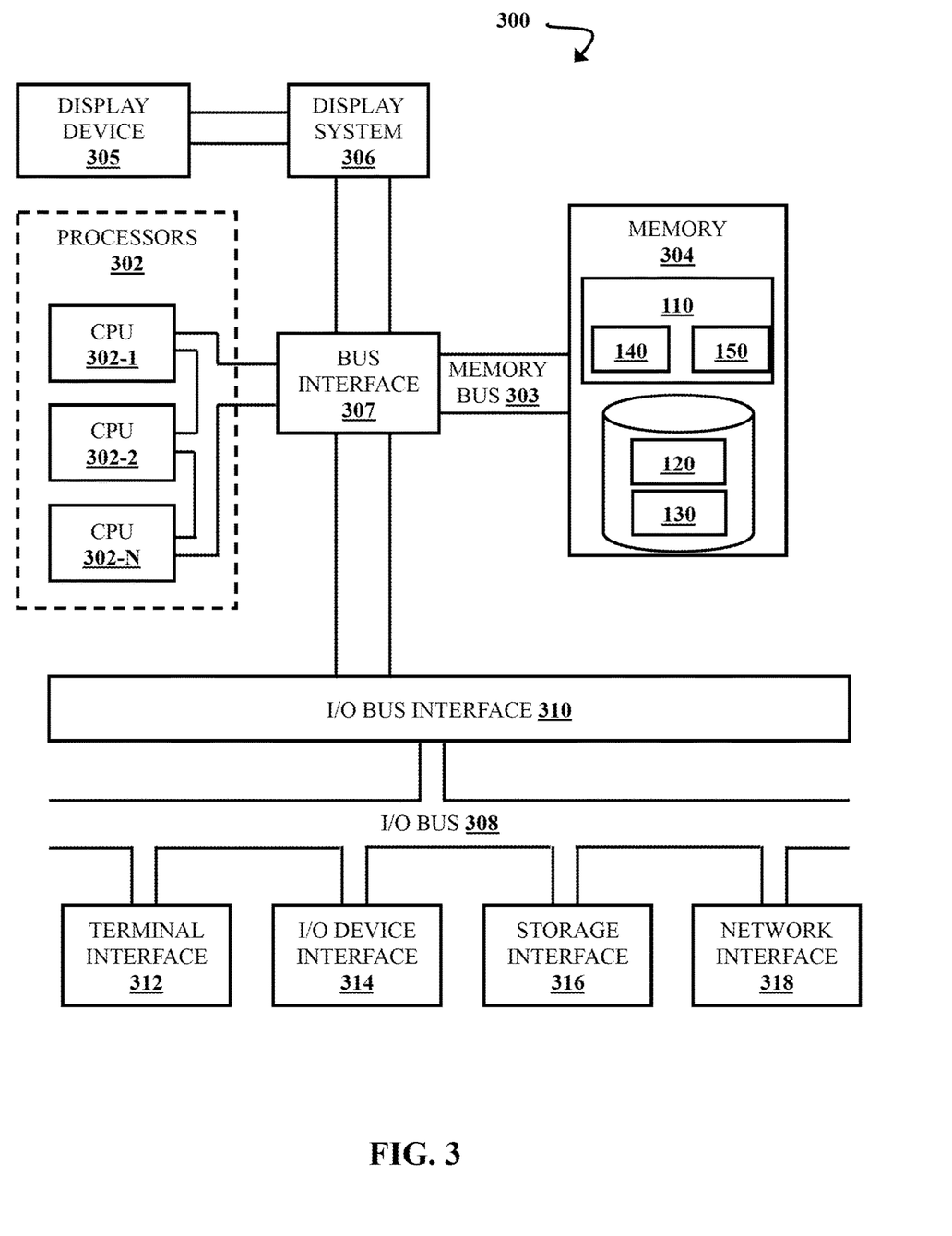
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302-1, 302-2, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300 and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The data processing component 110 (including the indexing module 140 and update module 150), dataset 120, and new data 130 (FIG. 1) are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the data processing component 110, dataset 120, and new data 130 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the data processing component 110, dataset 120, and new data 130 include instructions that execute on the processor 302 or instructions that are interpreted by instructions that execute on the processor 302 to carry out the functions as further described in this disclosure. In another embodiment, the data processing component 110, dataset 120, and new data 130 are implemented in hardware via semiconductor devices, chips, logical gates, circuits, circuit cards, and/or other physical hardware devices in lieu of, or in addition to, a processor-based system. In another embodiment, the data processing component 110, dataset 120, and new data 130 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
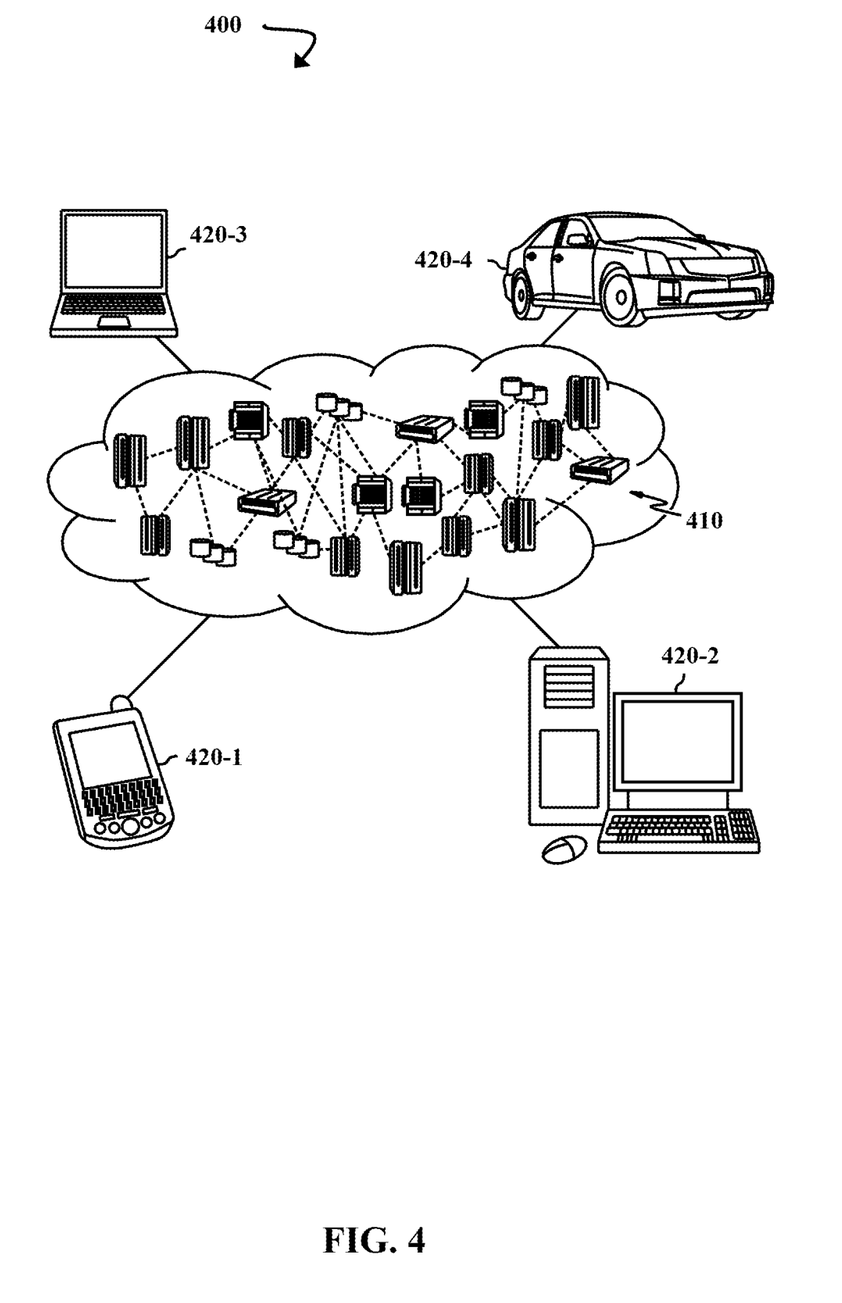
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420-1, desktop computer 420-2, laptop computer 420-3, and/or automobile computer system 420-4 may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420-1-420-4 shown in FIG. 4 are intended to be illustrative only and that computing nodes 410 and cloud computing environment 400 can communicate with any type of computerized device over any type of network and/or network addressable connection (e.g., using a web browser).

Figure 5:
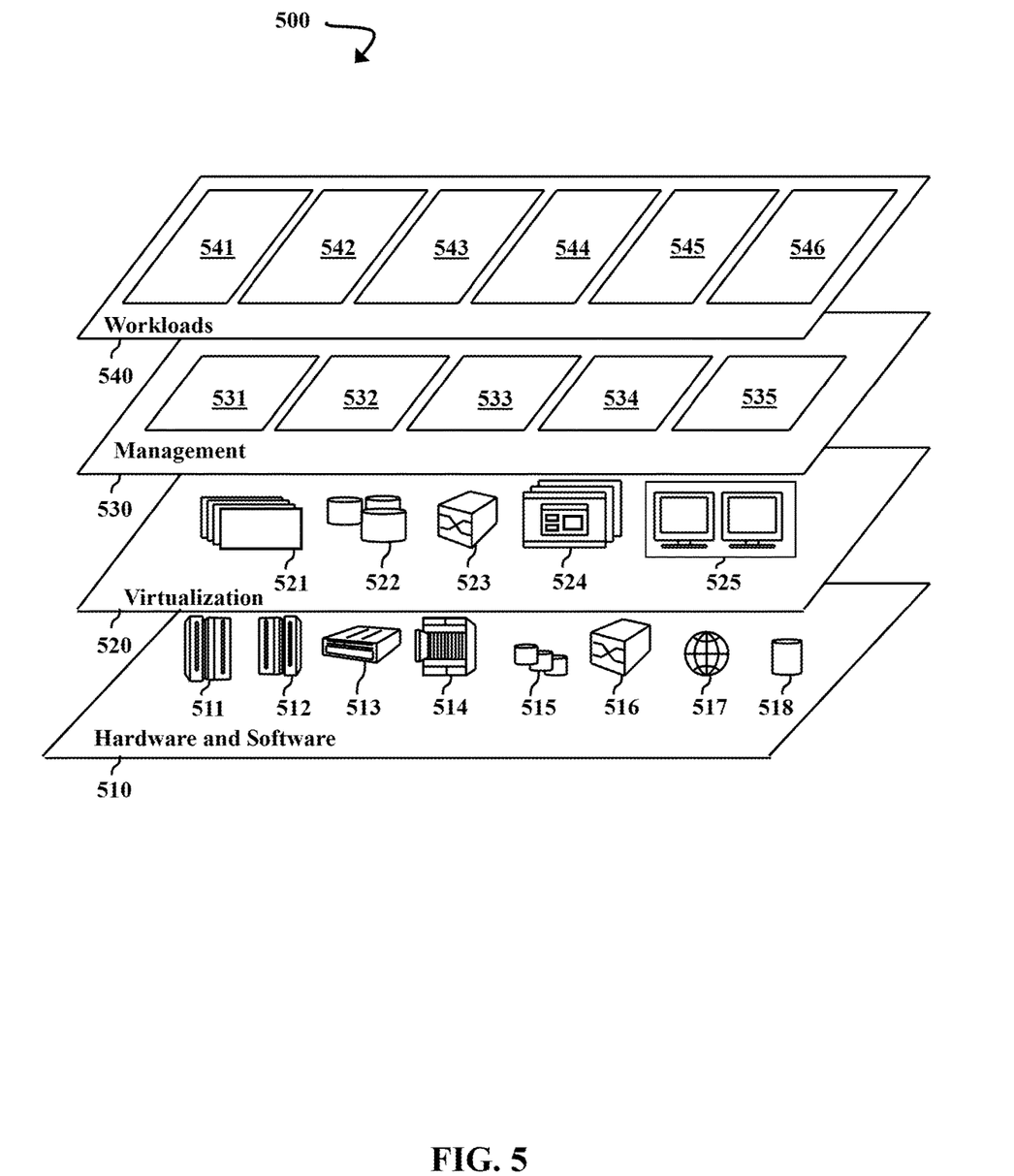
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and truncated SVD updating 546.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain and store instructions for use by an instruction execution device. Examples of computer readable storage media can include an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

What is claimed is:

1. A system, comprising:
    at least one processing component;
    at least one memory component; and
    a data processing component configured to carry out vector space modeling of an evolving dataset for a latent semantic analysis component of the system, wherein the evolving data set is stored as a matrix in the at least one memory component, and wherein the evolving dataset comprises a first set of data loaded as an initial matrix B with a truncated singular value decomposition (SVD) $B_k$ written as: $B_k=U_k\Sigma_k V_k^H$, wherein $U_k$ represents k leading left singular vectors of the initial matrix B, $\Sigma_k$ represents k leading singular values of the initial matrix B, and $V_k$ represents k leading right singular vectors of the initial matrix B, and wherein the data processing component comprises:
        an update module configured to, in response to receiving new data from at least one data source as an update to the evolving dataset, generating an updated truncated SVD of the evolving dataset, wherein the generating comprises:
            loading a second set of data from the data source into the evolving dataset as a new matrix;

combining the initial matrix B and the new matrix to form an updated matrix A, wherein a rank-k truncated SVD $A_k$ of the updated matrix A is written as: $A_k = \hat{U}_k \hat{\Sigma}_k \hat{V}_k^H$, wherein $\hat{U}_k$ represents k leading left singular vectors of the updated matrix A, $\hat{\Sigma}_k$ represents k leading singular values of the updated matrix A, and $\hat{V}_k^H$ represents k leading right singular vectors of the updated matrix A;

generating a first projection matrix Z, wherein range(Z) approximates range($\hat{U}_k$);

generating a second projection matrix W, wherein range($W^H$) approximates range($\hat{V}_k^H$); and determining an approximate truncated SVD of the updated matrix A written as $A_k \approx (ZF_k)\Theta_k(WG_k)^H$, wherein $\Theta_k$ represents k leading singular eigenvalues of a matrix $Z^H AW$, $F_k$ represents k leading left singular eigenvectors of the matrix $Z^H AW$, and $G_k$ represents k leading right singular eigenvectors of the matrix $Z^H AW$, and wherein the determining comprises:

setting the second projection matrix W equal to an identity matrix so that $Z^H AW = Z^H A$; and by carrying out 2k steps of a Lanczos algorithm on $Z^H AA^H Z$, determining the k leading left singular eigenvectors $F_k$ and the k leading singular eigenvalues $\Theta_k$; and an indexing module configured to:

in response to receiving a query at the latent analysis component, identify relationships between the query and terms in the updated evolving dataset, wherein the identifying comprises finding latent factor associations in the updated evolving dataset based on the updated truncated SVD; and return a result of the query based on the identified relationships.

2. The system of claim 1, wherein the generating the updated truncated SVD further comprises:

in response to the determining the approximate truncated SVD of the updated matrix A, loading the updated matrix A as a next initial matrix; and loading a next set of data as a next new matrix.

3. The system of claim 2, wherein the generating the updated truncated SVD further comprises:

combining the next initial matrix and the next new matrix to form a next updated matrix;

generating a next projection matrix, wherein the next projection matrix approximates k leading left singular vectors of the next updated matrix; and determining, based on the next initial matrix, the next new matrix, the approximate truncated SVD of the updated matrix, and the next projection matrix, an approximate truncated SVD of the next updated matrix.

4. The system of claim 3, wherein the determining the approximate truncated SVD of the next updated matrix includes carrying out 2k steps of a Lanczos algorithm on a matrix built from the next initial matrix, the next new matrix, and the approximate truncated SVD of the updated matrix.

5. The system of claim 1, wherein the initial matrix is a term-document matrix.

6. The system of claim 1, wherein the evolving dataset is part of a latent semantic indexing system.

7. The system of claim 1, wherein the initial matrix B is selected from the group consisting of a feature-term matrix, a term-term matrix, and a document-document matrix.

8. The system of claim 1, wherein the initial matrix B is a user rating-product matrix.

9. The system of claim 1, wherein the second set of data is loaded from at least one data source selected from the group consisting of ratings aggregators, review sites, streaming services, retailers, social media services, content delivery networks, text corpora, and spatiotemporal data sources.

10. The system of claim 1, wherein a full SVD of the initial matrix B is written as $B = U\Sigma V^H$, wherein U is an m×m unitary matrix, $\Sigma$ is an m×n diagonal matrix, and V is an n×n unitary matrix.

11. The system of claim 10, wherein the new matrix E is of size s×n, and wherein the updated matrix A is written as $$A = \begin{pmatrix} B \\ E \end{pmatrix}.$$

12. The system of claim 1, wherein the second set of data is loaded in batches.

13. The system of claim 1, further comprising, by the data processing component, repeating the generating the updated truncated SVD each time the evolving dataset receives new data from a data source.

14. A method, comprising:

by a data processing component of a computer system, carrying out vector space modeling of an evolving dataset for a latent analysis component of the computer system, wherein the evolving dataset is stored as a matrix in a memory subspace of the computer system, and wherein the evolving dataset comprises a first set of data as an initial matrix B with a truncated singular value decomposition (SVD) $B_k$ written as: $B_k = U_k \Sigma_k V_k^H$, wherein $U_k$ represents k leading left singular vectors of the initial matrix B, $\Sigma_k$ represents k leading singular values of the initial matrix B, and $V_k$ represents k leading right singular vectors of the initial matrix B, and wherein the carrying out the vector space modeling comprises:

receiving new data from at least one data source as an update to the evolving dataset; and in response to the receiving the new data, generating an updated truncated SVD of the evolving dataset, wherein the generating comprises, by an update module of the computer system:

loading a second set of data from the at least one data source into the evolving dataset as a new matrix E;

combining the initial matrix B and the new matrix E to form an updated matrix A, wherein a rank-k truncated SVD $A_k$ of the updated matrix A is written as: $A_k = \hat{U}_k \hat{\Sigma}_k \hat{V}_k^H$, wherein $\hat{U}_k$ represents k leading left singular vectors of the updated matrix A, $\hat{\Sigma}_k$ represents k leading singular values of the updated matrix A, and $\hat{V}_k^H$ represents k leading right singular vectors of the updated matrix A;

generating a first projection matrix Z, wherein range(Z) approximates range($\hat{U}_k$);

generating a second projection matrix W, wherein range($W^H$) approximates range($\hat{V}_k^H$); and determining an approximate truncated SVD of the updated matrix A written as $A_k \approx (ZF_k)\Theta_k(WG_k)^H$, wherein $\Theta_k$ represents k leading singular eigenvalues of a matrix $Z^H AW$, $F_k$ represents k leading left singular eigenvectors of the matrix $Z^H AW$, and $G_k$ represents k leading right singular eigenvectors of the matrix $Z^H AW$, and wherein the determining comprises:

setting the second projection matrix W equal to an identity matrix so that $Z^H AW = Z^H A$; and by carrying out 2k steps of a Lanczos algorithm on $Z^H AA^H Z$, determining the k leading left singular eigenvectors $F_k$ and the k leading singular eigenvalues $\Theta_k$;

receiving a query at the latent semantic analysis component;

in response to the receiving the query, identifying, by an indexing module of the computer system, relationships between the query and terms in the updated evolving dataset, wherein the identifying comprises finding latent factor associations in the updated evolving dataset based on the updated truncated SVD; and returning, by the indexing module, a result of the query based on the identified relationships.

15. The method of claim 14, further comprising:

in response to the determining the approximate truncated SVD of the updated matrix A, loading the updated matrix A as a next initial matrix; and loading a next set of data as a next new matrix.

16. The method of claim 15, further comprising:

combining the next initial matrix and the next new matrix to form a next updated matrix;

generating a next projection matrix, wherein the next projection matrix approximates k leading left singular vectors of the next updated matrix; and determining, based on the next initial matrix, the next new matrix, the approximate truncated SVD of the updated matrix, and the next projection matrix, an approximate truncated SVD of the next updated matrix.

17. The method of claim 14, wherein the initial matrix is a term-document matrix.

18. A computer program product, the computer program product comprising a computer readable storage medium having program instructions embodied therewith, the program instructions executable by a processor to cause a device to perform a method, the method comprising:

carrying out, by the processor, vector space modeling of an evolving dataset for a latent analysis system, wherein the evolving dataset is stored as a matrix in a memory subspace of the computer readable storage medium, and wherein the evolving dataset comprises a first set of data as an initial matrix B with a truncated singular value decomposition (SVD) $B_k$ written as: $B_k = U_k \Sigma_k V_k^H$, wherein $U_k$ represents k leading left singular vectors of the initial matrix B, $\Sigma_k$ represents k leading singular values of the initial matrix B, and $V_k$ represents k leading right singular vectors of the initial matrix B, and wherein the carrying out the vector space modeling comprises:

receiving new data from at least one data source as an update to the evolving dataset; and in response to the receiving the new data, generating an updated truncated SVD of the evolving dataset, wherein the generating comprises:

loading a second set of data from the data source into the evolving dataset as a new matrix E;

combining the initial matrix B and the new matrix E to form an updated matrix A, wherein a rank-k truncated SVD $A_k$ of the updated matrix A is written as: $A_k = \hat{U}_k \hat{\Sigma}_k \hat{V}_k^H$, wherein $\hat{U}_k$ represents k leading left singular vectors of the updated matrix A, $\hat{\Sigma}_k$ represents k leading singular values of the updated matrix A, and $\hat{V}_k^H$ represents k leading right singular vectors of the updated matrix A;

generating a first projection matrix Z, wherein range(Z) approximates range($\hat{U}_k$);

generating a second projection matrix W, wherein range(W) approximates range($\hat{V}_k^H$); and determining an approximate truncated SVD of the updated matrix A written as $A_k \approx (ZF_k)\Theta_k(WG_k)^H$, wherein $\Theta_k$ represents k leading singular eigenvalues of a matrix $Z^H AW$, $F_k$ represents k leading left singular eigenvectors of the matrix $Z^H AW$, and $G_k$ represents k leading right singular eigenvectors of the matrix $Z^H AW$, and wherein the determining comprises:

setting the second projection matrix W equal to an identity matrix so that $Z^H AW = Z^H A$; and by carrying out 2k steps of a Lanczos algorithm on $Z^H AA^H Z$, determining the k leading left singular eigenvectors $F_k$ and the k leading singular eigenvalues $\Theta_k$;

receiving a query at the latent semantic analysis system;

in response to the receiving the query, identifying relationships between the query and terms in the updated evolving dataset, wherein the identifying comprises, by the processor, finding latent factor associations in the updated evolving dataset based on the updated truncated SVD; and returning, by the processor, a result of the query based on the identified relationships.

19. The computer program product of claim 18, further comprising:

in response to the determining the approximate truncated SVD of the updated matrix, loading the updated matrix A as a next initial matrix; and loading a next set of data as a next new matrix.

20. The computer program product of claim 19, further comprising:

combining the next initial matrix and the next new matrix to form a next updated matrix;

generating a next projection matrix, wherein the next projection matrix approximates k leading left singular vectors of the next updated matrix; and determining, based on the next initial matrix, the next new matrix, the approximate truncated SVD of the updated matrix, and the next projection matrix, an approximate truncated SVD of the next updated matrix.

\* \* \* \* \*